United States Patent [19]

Banthin et al.

[11] 4,007,587
[45] Feb. 15, 1977

[54] APPARATUS FOR AND METHOD OF SUPPRESSING INFRARED RADIATION EMITTED FROM GAS TURBINE ENGINE

[75] Inventors: Clifford R. Banthin, Easton; Gary W. Decko, Wethersfield; John F. Hurley, Huntington, all of Conn.

[73] Assignee: Avco Corporation, Stratford, Conn.

[22] Filed: Nov. 19, 1975

[21] Appl. No.: 633,226

[52] U.S. Cl. .................. 60/204; 60/271; 60/39.5; 239/265.13; 239/127.3
[51] Int. Cl.² .................. F02K 1/02; F02K 1/26
[58] Field of Search .......... 60/39.5, 271, 230, 269; 239/265.13, 265.17, 127.3, 265.19; 181/33 HB, 33 HC, 33 HD

[56] References Cited

UNITED STATES PATENTS

| | | | |
|---|---|---|---|
| 3,177,972 | 4/1965 | Wirt | 181/33 HB |
| 3,206,929 | 9/1965 | Marchant et al. | 60/230 |
| 3,246,469 | 4/1966 | Moore | 60/266 |
| 3,262,264 | 7/1966 | Gardiner et al. | 239/127.3 |
| 3,467,312 | 9/1969 | Mehr | 239/127.3 |
| 3,715,009 | 2/1973 | Smith et al. | 181/33 HC |
| 3,815,360 | 6/1974 | Wellinitz | 60/39.5 |
| 3,817,030 | 6/1974 | Renius et al. | 60/39.5 |
| 3,848,697 | 11/1974 | Jannot et al. | 239/127.3 |
| 3,910,375 | 10/1975 | Hache et al. | 239/265.13 |
| 3,921,906 | 11/1975 | Nye et al. | 239/265.17 |

*Primary Examiner*—William L. Freeh
*Assistant Examiner*—Robert E. Garrett
*Attorney, Agent, or Firm*—Charles M. Hogan; Irwin P. Garfinkle; Joseph V. Tassone

[57] ABSTRACT

An apparatus for and method of suppressing infrared radiation emitted from hot metal parts at the aft end of a gas turbine engine and from the exhaust gas plume thereof is provided and such apparatus comprises a dual purpose ejector vane assembly operatively attached to the engine for introducing cooling ambient air into the hot engine exhaust gases and hiding the hot metal parts. The vane assembly has a duct structure for receiving and confining the engine exhaust gases and the assembly provides at least one stream of cooling ambient air across one full dimension of the duct structure and exhaust gases confined thereby with the stream of cooling ambient air mixing with the hot engine exhaust gases across the full dimension of the duct structure to assure optimum mixing thereof.

25 Claims, 10 Drawing Figures

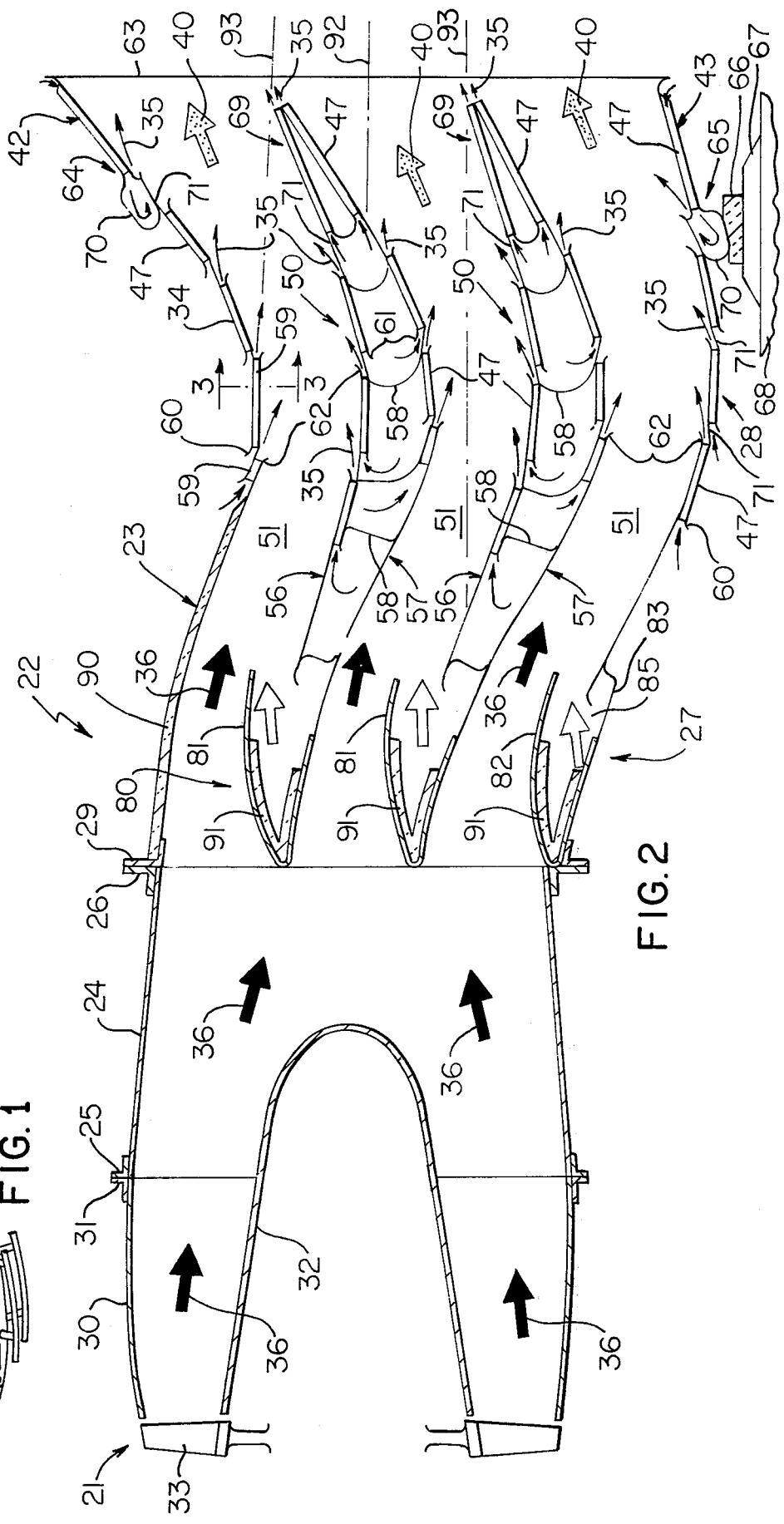

APPARATUS FOR AND METHOD OF SUPPRESSING INFRARED RADIATION EMITTED FROM GAS TURBINE ENGINE

BACKGROUND OF THE INVENTION

Many military aircraft are powered by gas turbine engines which emit infrared radiation from exposed hot metal parts and from their hot exhaust gas plumes and in military conflicts these aircraft are vulnerable to missles which seek and home on such infrared radiation in an effort to destroy the engine and its aircraft. Particularly in gas turbine engine powered helicopter aircraft, for example, it is necessary to provide suppression of infrared radiation under conditions of hover or relatively low flight speed where ram air is not available as a source of cooling air.

There have been numerous infrared radiation suppressors proposed previously; however, such previous suppresors are generally deficient because they either require air pumps, or the like, to provide cooling air at a substantial engine power loss or weight penalty, complex heat transfer panel designs, comparatively large installation space, or complex ducting making such previous suppressors impractical for many aircraft, particularly helicopter-type aircraft.

Accordingly, the need exists for a simple and economical apparatus for suppressing infrared radiation emitted from hot metal parts at the aft end of a gas turbine engine and from the exhaust gas plume thereof which overcomes the above-mentioned deficiencies.

SUMMARY

It is a feature of this invention to provide a simple, economical, and reliable method of suppressing infrared radiation emitted from hot metal parts at the aft end of a gas turbine engine and from the exhaust gas plume thereof during engine operation.

Another feature of this invention is to provide an apparatus for and method of suppressing infrared radiation of the character mentioned which utilizes fixed though adjustable components while assuring minimum drain of engine power.

Another feature of this invention is to provide an apparatus for and method of suppressing infrared radiation utilizing a dual purpose ejector vane assembly which provides visual hiding of hot metal parts and exhaust gas plume diluting vanes in a single duct-like structure.

Another feature of this invention is to provide an apparatus for and method of suppressing infrared radiation emitted from hot metal parts at the aft end of a gas turbine engine and from the exhaust gas plume thereof during engine operation wherein such apparatus comprises a dual purpose ejector vane assembly for introducing cooling ambient air into the hot engine exhaust gases and hiding the hot metal parts. The assembly is suitably attached to the engine by a transition member and has a duct structure for receiving and confining the engine exhaust gases and the assembly has ejector means which provides at least one stream of cooling ambient air across one full dimension of the duct structure and the corresponding full dimension of exhaust gases confined thereby during engine operation and mixing the stream with the hot engine exhaust gases across such full dimension to assure optimum mixing thereof.

Therefore, it is an object of this invention to provide an apparatus for and method of suppressing infrared radiation emitted from hot metal parts at the aft end of a gas turbine engine and from the exhaust gas plume thereof during engine operation having one or more of the novel features set forth above or hereinafter shown or described.

Other objects, features, details, uses, and advantages of this invention will become apparent from the embodiments thereof presented in the following specification, claims and drawings.

BRIEF DESCRIPTION OF THE DRAWINGS

The accompanying drawings show present preferred embodiments of this invention, in which FIG. 1 is a perspective view illustrating a typical aircraft in the form of a helicopter which utilizes the apparatus and method of this invention for suppressing infrared radiation;

FIG. 2 is a view with parts in cross section, parts in elevation, parts broken away, and parts shown schematically illustrating details of the apparatus and method utilized on the helicopter of FIG. 1;

FIG. 3 is a fragmentary cross-sectional view taken essentially on the line 3—3 of FIG. 2 and illustrating an exemplary heat transfer panel assembly comprising the duct structure of the infrared radiation suppressor apparatus of FIG. 2 and particularly illustrating that the panel assembly is defined by a pair of wall members having a plain finned core member fixed therebetween.

DESCRIPTION OF ILLUSTRATED EMBODIMENTS

Figure 4:
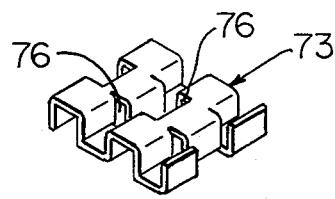
FIG. 4 is a perspective view illustrating the construction of another exemplary core member which may be fixed between the wall members shown in FIG. 3.

Reference is now made to FIG. 1 of the drawings which illustrates an exemplary aircraft shown as a helicopter 20 which utilizes a gas turbine engine 21 as its main power source and the engine 21 employs an exemplary apparatus and method of this invention for suppressing infrared radiation emitted from hot metal parts at the aft end of the gas turbine engine 21 and from the exhaust gas plume thereof during engine operation and such apparatus is designated generally by the reference numeral 22 in FIG. 2. The apparatus 22 comprises a dual purpose ejector vane assembly which is designated generally by the reference numeral 23 and means attaching the vane assembly 23 to the engine 21 including a transition member 24 which has a pair of flanges 25 and 26, each of L-shaped cross section, suitably fixed to opposite ends thereof.

The ejector vane assembly 23 has a forward portion 27 and an aft portion 28 and the forward portion 27 has a flange 29 suitably fixed thereto which is in turn fixed to the flange 26 to attach the assembly 23 to the transition member 24. The forward end of the transition member 24 is fixed to a tubular metal portion 30 comprising the aft end of the gas turbine engine 21 by suitably fixing the forward flange 25 of the member 24 to a flange 31 fixed to the terminal aft end of tubular metal portion 30. The engine 21 is shown with a central hollow bullet-nosed metal portion 32 which is convex or domed in the direction of the exhaust gas flow and is suitably supported downstream of the turbine 33 of the gas turbine engine 21 and as is well known in the art.

The vane assembly 23 is comprised of a duct structure 34 defined by a plurality of four main walls, to be described subsequently, for receiving and confining the engine exhaust gases and ejector means (also to be subsequently described) providing at least one stream of cooling ambient air across one full dimension of the duct structure 34 and thus across one full dimension of the exhaust gases confined by the duct structure. In this example of the invention means is provided for introducing a plurality of roughly parallel streams of cooling ambient air across a full dimension of the duct structure 34 and each of the streams in this example of the invention is illustrated in FIG. 2 and designated schematically by an arrow 35. As seen in FIG. 2 a comparatively large number of streams 35 is introduced in the top, bottom, and middle of the duct structure of the vane assembly whereby only a few representative streams and hence a few representative arrows are designated by the reference numeral 35.

The plurality of streams 35 of cooling ambient air mix with the hot engine exhaust gases which are designated by solid arrows 36 with such mixing taking place across the full dimension of the duct structure 34 of the vane assembly 23 to provide an optimum mixing action whereby a cooled mixture of exhaust gases and cooling ambient air exits the ejector vane assembly 23 and is designated by arrows 40 having dots therein; and, this cooled mixture is sufficiently cool that it cannot be detected by a heat-seeking missile. Further, the streams 35 of cooling ambient air serve to cool the hot metal of the duct structure 34 sufficiently that it cannot be detected by a heat-seeking missile.

Figure 6:
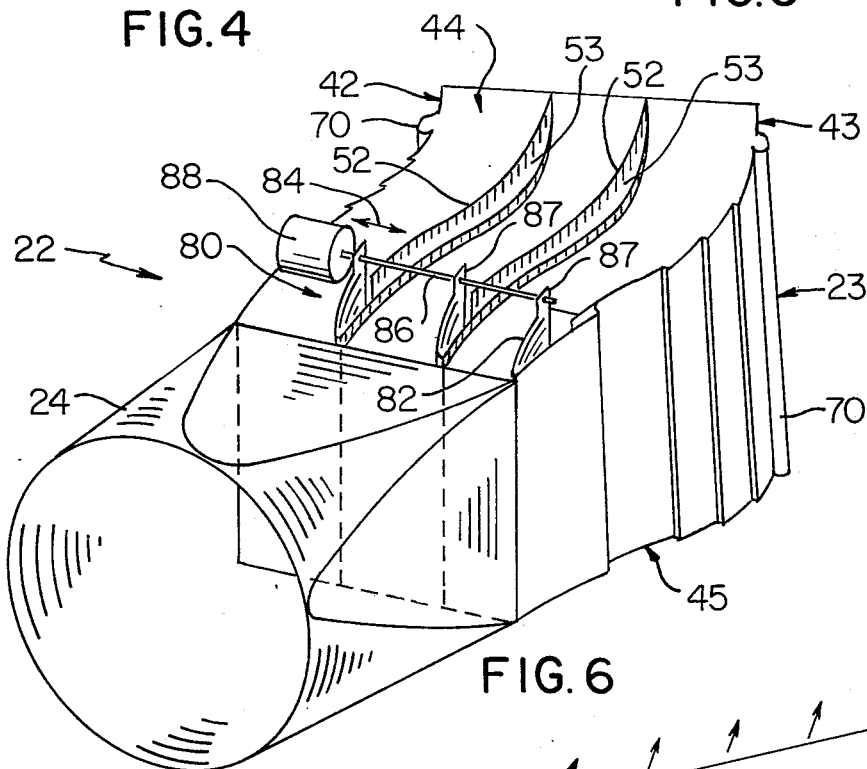
FIG. 6 is a perspective view of the radiation suppressor apparatus with detailed features kept at a minimum and particularly illustrating the undulating configurations of the walls defining the aft portion of such apparatus and the structure at the forward portion of the assembly with its circular to rectangular outline transition member.
Figure 9:
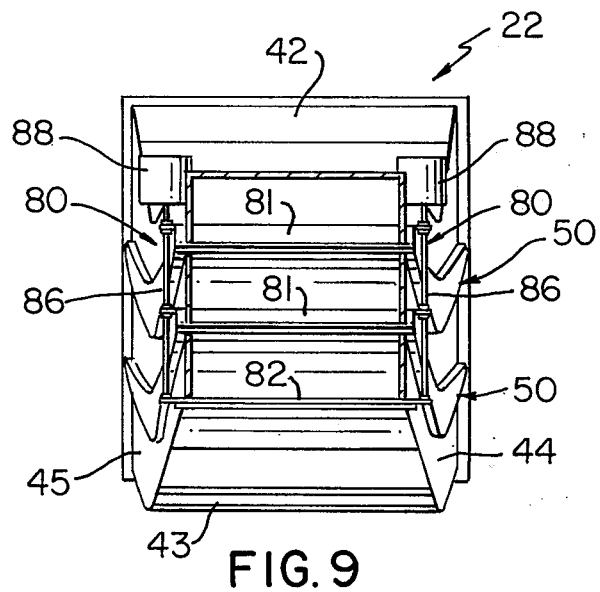
FIG. 9 is a view taken essentially on the line 9—9 of FIG. 8.
Figure 10:
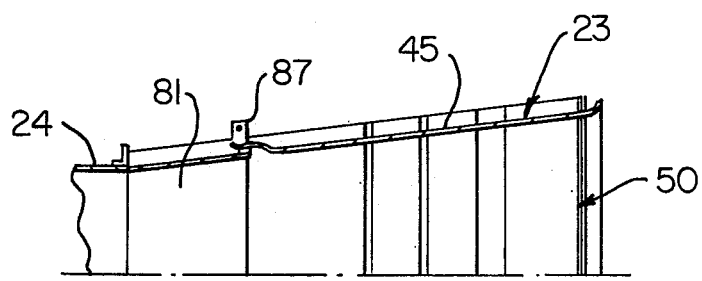
FIG. 10 is a view taken essentially on the line 10—10 of FIG. 8 and illustrating the duct structure arranged on one side of its center line with the structure on the opposite side of such center line being similar and symetrically arranged therewith.

As previously mentioned, and as best seen in FIG. 6, the vane assembly 23 is comprised of a duct structure 34 defined by a plurality of four main walls arranged in two opposed or oppositely arranged pairs having walls 42–43 in one pair and walls 44–45 in the other pair. As seen in FIGS. 6, 9, and 10, each of the walls 42 and 43 of this example has an undulating configuration; however, each of the walls 44 and 45 is substantially flat and such walls diverge from each other in a rearward direction. Accordingly, it will be seen that the cross-sectional area of the duct structure increases as the distance rearwardly from the engine 21 increases.

The vane assembly 23 has integral ejector means therein which provides a plurality of streams of cooling ambient air and in this example such means comprises a plurality of heat transfer panel assemblies in each wall 42 and 43 and each panel assembly is designated by the same general reference numeral 47 even though the panel assemblies 47 are of different sizes. The heat transfer panel assemblies or panels 47 will be described in more detail subsequently.

The integral ejector means of the vane assembly 23 for providing a plurality of streams of cooling ambient air further comprises at least one tubular vane and in this example, preferably comprises a plurality of tubular vanes shown as two hollow airfoil-shaped vanes each designated generally by the reference numeral 50.

Each tubular vane 50 is disposed between the spaced apart pair of undulating walls 42 and 43 and the two tubular vanes 50 divide the volume between the pair of walls 42 and 43 into a plurality of three chambers of substantially equal volume with each of such chamber being designated generally by the reference numeral 51 in FIG. 2. Each chamber 51 has an undulating configuration defined by the undulating configurations of the associated walls defining such chamber.

Figure 7:
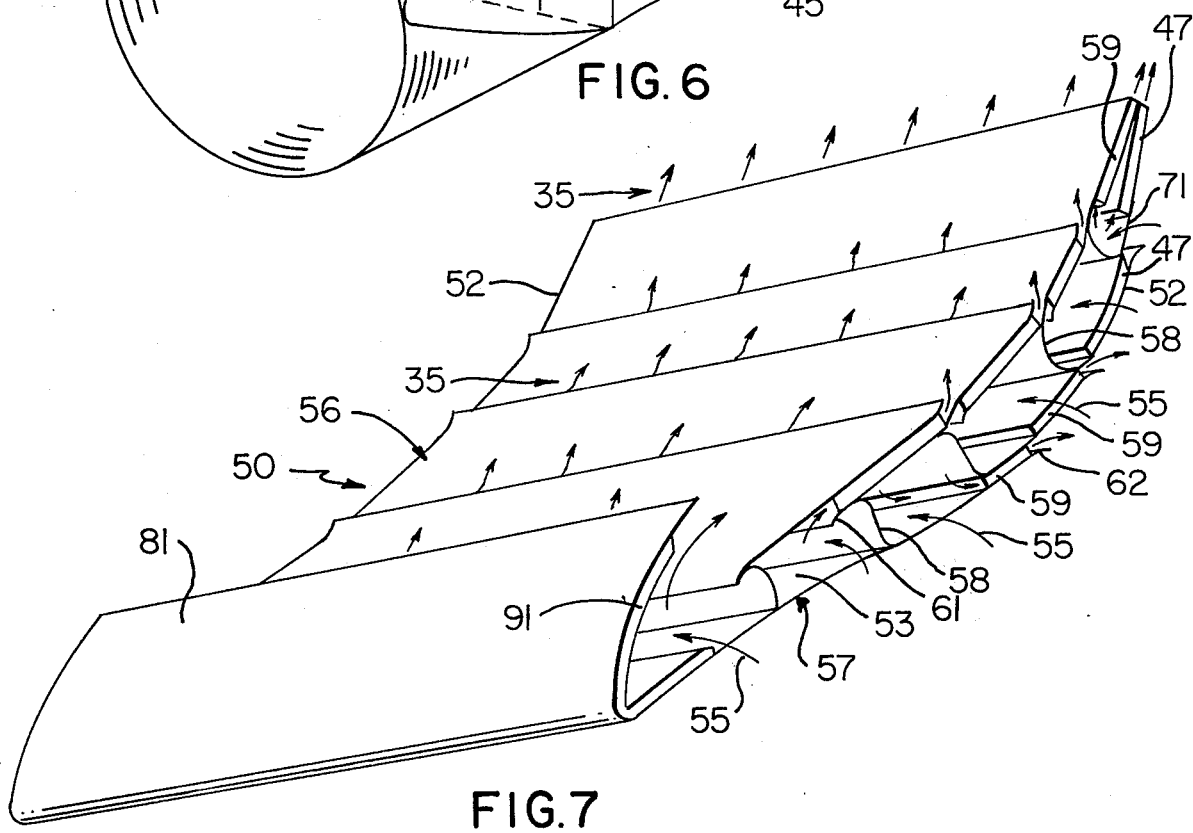
FIG. 7 is a perspective view particularly illustrating a typical hollow airfoil-shaped vane used in the central area of the duct structure.
Figure 8:
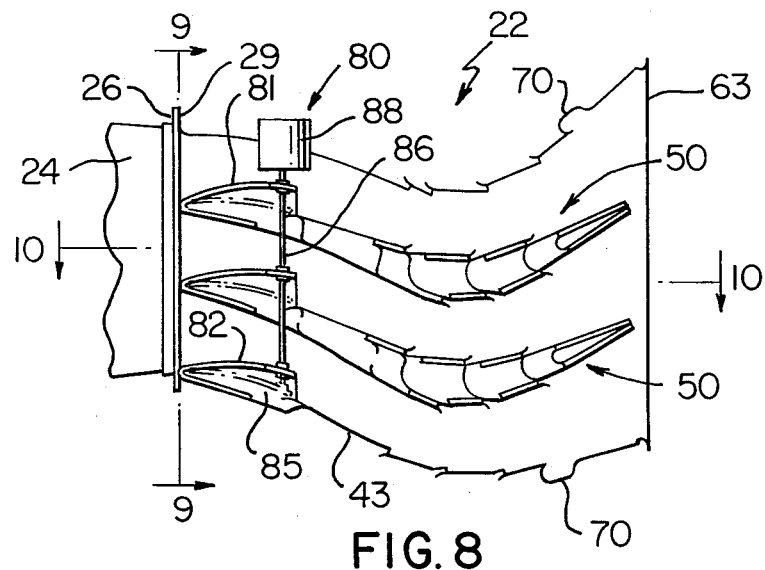
FIG. 8 is a view similar to the aft portion of FIG. 2 and particularly illustrating an actuating mechanism and associated components used to provide some control of the amount of cooling ambient air introduced into the apparatus.

As best seen in FIG. 6 of the drawings, each airfoil-shaped vane 50 has opposite end portions 52 provided with open ends 53. Each end portion 52 extends through an associated one of the substantially flat walls 44 or 45 so that the open ends 52 are exposed to ambient air, also see FIG. 7. Each tubular vane 50 serves to introduce additional cooling ambient air through its open ends 53 in a direction substantially perpendicular to the walls 44 and 45 as shown by arrows 55 and the additional cooling ambient air is turned by its tubular vane 50 and provided into the central part or area of the exhaust gases 36 from the gas turbine engine at locations between the spaced opposed walls 42 and 43 in a plurality of roughly parallel streams and each parallel stream is indicated by a set of arrows at a few typical locations in FIG. 7 of the drawings and each stream is also designated by the reference numeral 35, also see FIG. 2.

Each vane 50 is, in essence, comprised of a pair of cooperating undulating walls 56 and 57 defined primarily by a plurality of integral interconnected heat transfer panel assemblies or panels also designated by the reference numeral 47; and, as described for the walls 42 and 43 the heat transfer panels of the vanes 50 may be of different sizes and different heat transfer areas. The heat transfer panels 47 comprising the vanes 50 and walls 42 and 43 serve to cool the walls from the hot engine exhaust gases flowing thereagainst by conductive and convective heat transfer and the cooling ambient air flowing through the panels provides a cooling of the walls across the full width of the duct structure 34. In addition, as the cooling ambient air exits each panel 47, it serves to cool the hot exhaust gases.

The cooling ambient air for the hot engine exhaust gases whether provided in the roughly parallel streams 35 through walls 42 and 43 or through walls defining the tubular vanes 50 is pulled into or introduced by ejector action and such action is well known in the art.

As previously mentioned, the additional cooling ambient air through each vane 50 is turned by its vane from its flow direction which is initially perpendicular to the open ends 53 of the vane to a flow direction which is with or parallel to the flow of the exhaust gases. The manifolding of cooling ambient air in each vane 50 is achieved by a plurality of integral baffles 58 which also serve as structural baffles for the opposed contoured or undulating walls 56 and 57 of the vane 50. The baffles 58 extend across the full width of an associated vane 50 and although each baffle may be sightly different in size and arrangement than an adjacent baffle, all baffles in each vane 50 are represented by reference numerals 58 and only at a few typical locations.

As previously mentioned, each wall 42 and 43 of the duct structure 34 and each wall 56 and 57 of each tubular vane 50 has a plurality of heat transfer panels 47. Each heat transfer panel 47 extends across the full width of its associated wall and has integral slot means defined therein and such integral slot means in each instance will be designated by the reference numeral 59 and a few typical slot means so designated in each wall 42, 43, 56, and 57, also see FIG. 3.

Each heat transfer panel 47 associated with each wall 42 and 43 has an outwardly diverging portion 60 which diverges outwardly from the duct structure 34 and assures flow of cooling ambient air therethrough and into an associated heat transfer panel 47 in a substantially unobstructed manner. Each heat transfer panel 47 associated with a wall 56 and 57 of an air-foil-shaped vane 50 has similar portions designated by the reference numeral 61 at a few locations and the diverging portions diverge or open toward the central part of their associated vane to assure unobstructed flow of air entering therein.

Each heat transfer panel 47 associated with each wall 42 and 43 and associated with each airfoil-shaped vane 50 also has a deflector portion which is often referred to in the art as a flipper 62 associated therewith, and each deflector 62 aids in promoting efficient ejector action under substantially all operating conditions of the gas turbine engine 21 associated with the apparatus 22.

As indicated above, each heat transfer panel 47 associated with walls 42, 43, 56, and 57 has slot means 59 defined as an integral part thereof and each panel 47 with its slot means 59 defines ejector means in the duct structure 34 and hence the vane assembly 23. The ejector action is provided by the slot means 59 in the heat transfer panels 47 under substantially all engine operating conditions and is such that cooling ambient air mixes directly with the hot engine exhaust gases and in a thorough and efficient manner due to the direct, i.e., fluid to fluid, mixing of fluid streams at different temperatures.

Each heat transfer panel 47 provided in each vane 50 is constructed and arranged so that flow of cooling ambinet air through its integral slot means is substantially parallel to and with the flow of hot engine exhaust gases through the apparatus 22. Similarly, the flow of cooling ambient air through the heat transfer panels provided in the forward portions of the walls 42 and 43 is also in parallel relation to the flow of hot engine exhaust gases through the apparatus 22. However, each wall 42 and 43 in this example of the invention has a heat transfer panel 47 adjacent the exit 63 of the vane assembly 23 which provides flow of cooling ambient air through such adjacent panel 47 in counterflow to the flow of hot engine exhaust gases through the assembly 23 and thus apparatus 22 and such counterflow arrangement will be readily apparent as shown at 64 in FIG. 2 of the drawings and as shown at 64 and 65 for the walls 42 and 43 respectively.

The counterflow arrangement shown at 64 and 65 assures flow of cooling ambient air into the rear portions of the walls 42 and 43 even in applications where it is difficult to provide cooling ambient air adjacent such rear portions. The counterflow arrangement assures cooling ambient air flow through these rear portion cooling panels since the panel exit slot is located upstream of the suppressor duct exit where stream static pressures are lower than ambient. It should also be noted that these rearmost heat transfer panels 47 shown at 64 and 65 also have bulbous portions 70 which enable turning of the cooling air flowing therethrough.

Although each of the airfoil-shaped vanes 50 in this example of the invention provides flow of cooling ambient air in the direction of or with the flow of engine exhaust gases, it will be appreciated that the rearmost portions of the two vanes 50 shown at two locations 69 may also be provided with their rearmost heat transfer panels 47 constructed to provide counterflow of cooling ambient air therethrough. Such counterflow may be achieved utilizing techniques which are known in the art and in a similar manner as shown at 64 and 65 for the walls 42 and 43 respectively.

Each heat transfer panel 47 is defined as an integral part of its associated wall with a suitable common wall portion extending between a pair of immediately adjacent panels with each common wall portion being designated by the reference numeral 71 at a few typical locations. The heat transfer panels 47 may be of different sizes as previously mentioned. However, regardless of the size of a particular heat transfer panel 47, each panel 47 is defined by an undulating core strip 73 as shown in FIG. 3, for example, with such strip being suitably fixed in sandwiched relation between a cooperating pair of wall portions 74 and 75. The undulating strip 73 serves to control the flow area through its associated heat transfer panel 47, provides additional heat transfer area, and also serves as a structural member for enhancing the structural integrity of its panel 47 and thus its associated wall, either 42, 43, 56, or 57. The undulating heat transfer strip 73 may be made of any suitable material and in any suitable wave form such as sinusoidal, saw-toothed, or rectangular. The strip 73 of FIG. 3 is shown as a plain strip having a substantially rectangular wave form.

Figure 5:
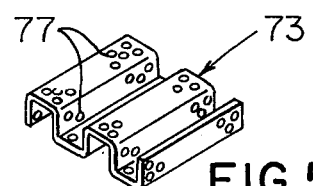
FIG. 5 is view similar to FIG. 4 illustrating another exemplary core member which may be fixed between the wall members of FIG. 3.

The construction of the strip may be modified to increase its heat transfer efficiency and examples of such modified strips are shown in FIGS. 4 and 5 of the drawings. For example, FIG. 4 illustrates a modification of a strip also designated by the reference numeral 73 and which has a plurality of openings 76 defined therein and provided as turbulators which improve the heat transfer action. Similarly, FIG. 5 illustrates a modification of a strip also designated by the reference numeral 73 which has a plurality of circular openings 77 defined therein for the same purpose as well as for the purpose of aiding in bonding the strip 73 between members such as 74 and 75 associated therewith. The modified strips 73 of FIGS. 4 and 5 may be used interchangeably with the strip of FIG. 3.

As is well known in the art, the utilization of means providing an ejector action for the introduction of cooling ambient air in an apparatus such as the apparatus 22 results in a slight loss of engine power during conditions where the maximum amount of cooling ambient air is introduced. Although the loss of power is only a few percent, it is desirable to keep such loss at a minimum and to utilize maximum infrared radiation suppression and hence maximum flow of cooling ambient air only during conditions where an enemy is attempting to deploy heat-seeking missiles. Under non-threatening conditions, it is desirable to provide the apparatus 22 with means for controlling the amount of cooling ambient air introduced therein and such means is designated generally by the reference numeral 80. The cooling air control means 80 of this example comprises a movable member 81 provided in the forward portion of each tubular vane 50 and a movable portion 82 provided in a forward portion 83 of the wall 43. Each movable portion 81 is adapted to be moved in opposed directions as indicated by the double arrow 84 in FIG. 6 to, in essence, increase or decrease the end area at the forward portion of its vane 50 to vary the amount of air introduced therein. Similarly, the movable portion 82 is adapted to introduce cooling ambient air into an area 85 provided at the forward end of the undulating wall 43.

In this example of the invention, the movable portions 81 are shown defined as an integral part of V-shaped forward wall portions of their associated airfoil-shaped vanes 50 with such wall portions having cooperating legs one of which is defined in each instance by a portion 81; similarly, the movable portion 82 is defined as a movable leg of a V-shaped forward portion fixed to the wall 43 with the other leg being defined by forward wall portion 83; however, it is to be understood that portions 81 and 82 may be defined in any suitable manner known in the art and each need not necessarily be defined as an integral part of an associated wall. Portions 81 and 82 may be defined as movable walls of separate chambers each associated with and structurally fastened to an associated vane 50 or wall such as wall 43 (or 42) and for the same purpose of introducing more or less cooling ambient air into the ejector vane assembly 23 of the suppressor 22 as desired.

The movable portions 81 or 82 may be moved or actuated utilizing any actuating means known in the art; and, in this example of the invention, each of such portions is moved by a pair of actuators each designated by the same reference numeral 88 and each actuator 88 has an actuating rod 86 driven thereby which is fixed to a suitable tab-like member or tab 87 extending from each portion 81 and 82. Each rod 86 is actuated by its associated actuator 88 to move the movable portions 81 and 82 to increase or decrease the end flow area thereof and thereby control the amount of cooling ambient air introduced by ejector action. Each actuator 88 may be of any suitable type such as mechanical, electrical, pneumatic, hydraulic, or combinations thereof and each actuator may be suitably connected to a power source therefor using any suitable technique known in the art.

The apparatus 22 may be provided with suitable thermal insulation means to cover or shroud hot portions thereof at various positions therealong; and, such thermal insulation means prevents direct viewing of hot portions of the apparatus 22. The thermal insulation means may be in the form of an insulating member 90 provided adjacent the flange 29 and easily flexed roughly V-shaped members 91 associated with the upstream portions of the vanes 50 and the wall 43. The thermal insulating members 90 and 91 may be made of any thermal insulating material known in the art such as fiberglass, asbestos, and the like.

The infrared radiation suppressor or apparatus 22 is basically a fixed construction free of moving parts, i.e., parts which must move to provide cooling air flow, however, as explained earlier, portions 81 and 82 are movable or adjustable to a plurality of fixed positions and once moved to a fixed position, the operation of the apparatus 22 is achieved using flow of cooling ambient air through fixed parts.

The apparatus 22 provides smooth flow of exhaust gases from a circular area to a rectangular area and indeed the ejector vane assembly 23 of the apparatus 22 has a rectangular cross-sectional outline which increases in the direction of fluid flow to a comparatively large flow exit area and the assembly 23 also gives a diffusion process to the entire engine flow stream. The vane assembly 23 is comprised of simple walls free of compound curves and such walls may be made from sheet metal to thereby keep costs at a minimum. Basically each outside wall 42, 43, and the walls 56 and 57 of tubular vanes 50 are made primarily of associated flat heat transfer panels 47 interconnected by wall portions 71 between associated panels.

The vane assembly 23 has minimum overall length and frontal area and a roughly 10 L/D ejector mixing length has been established for optimum ejector performance where L is defined as the developed length and D as the hydraulic diameter. The length of assembly 23 is minimized by several factors including the undulating, often called S-shaped, configurations of the outside walls 42–43, the utilization of the tubular vanes 50 to break the exhaust path into smaller separate streams which for a given flow path with its fixed aerodynamic losses results in a shorter length than would otherwise be achieved with a single large flow path, and the use of wall portions which provide a hot metal hiding function as well as serving as ejectors.

The vane assembly 23 with its self-induced ejector action free of moving parts such as belts, motors, and the like, operates at all air flows with minimum likelihood of malfunction.

The airfoil-shaped vanes 50 are often referred to as being of modular construction and are substantially identical whereby the cost of fabricating such vanes is kept at a minimum. The vanes 50 are also easy to repair, are readily accessible, and are interchangeable whereby maintenance of each assembly 23 is easily achieved with minimum effort.

As will be readily apparent from FIG. 2 of the drawings, the airfoil-shaped vanes 50 and the walls 42 and 43 have rear portions which are inclined at certain angles of inclination relative to a longitudinal axis 92 through the apparatus 22. It will be appreciated that the aft portion of each wall 42 and 43 and vane 50 may be inclined at any desired angle relative to the axis 92 and depending on the application and preferably such angles range between 20° and 45°.

The vane assembly 23 serves the dual purpose of providing cooling ambient air by ejector action as well as hiding of hot metal parts due to the undulating configurations of certain of its component portions and because of this dual function such assembly has been popularly referred to as a vane-vane infrared radiation suppression assembly 23. To highlight how the configuration of the assembly 23 provides hiding of hot metal parts, it will be seen that the exhaust gas stream is broken into three streams and an optimum hiding action is provided as will be readily apparent from a typical pair of lines of sight each indicated by dot-dash lines 93 in FIG. 2.

The entire apparatus 22 may be rotated about its central longitudinal axis 92 any desired amount so that fluid exiting therefrom may be directed upwardly relative to the fuselage 68 or horizontally to the left or right above such fuselage or at some other angle, as desired.

The apparatus 22 may be made employing any suitable material used in the art to make this type of structure; and the size thereof will vary depending upon the size engine employed and the aircraft application.

In this disclosure of the invention, each of the opposed walls 42 and 43 of the duct structure 34 has an undulating configuration and such walls diverge from each other in a rearward direction; and, each of the opposed walls 44 and 45 has a substantially planar or flat configuration and walls 44-45 also diverge rearwardly. However, it will be appreciated the walls 44-45 may have non-planar configurations and the walls 42-43 may have other configurations. Further, the pairs of walls 42-43 and 44-45 need not necessarily diverge but may be disposed roughly parallel or may converge slightly in a rearward direction.

While present exemplary embodiments of this invention, and methods of practicing the same, have been illustrated and described, it will be recognized that this invention may be otherwise variously embodied and practiced within the scope of the following claims.

What is claimed is:

1. An apparatus for suppressing infrared radiation emitted from hot metal parts at the aft end of a gas turbine engine and from the exhaust gas plume thereof during engine operation comprising a dual purpose ejector vane assembly operatively attached to said engine for introducing cooling ambient air into the hot engine exhaust gases and hiding said hot metal parts and means attaching said vane assembly to said engine, said vane assembly comprising, a tubular duct structure for receiving a confining said engine exhaust gases, and ejector means providing at least one stream of cooling ambient air completely across said duct structure to break the exhaust gases confined by said duct structure during engine operation into a plurality of separate exhaust gas streams and provide optimum mixing of said one stream with said exhaust gases completely across said duct structure.

2. An apparatus as set forth in claim 1 in which said ejector means comprises means providing at least another stream of cooling ambient air completely across said duct structure and the exhaust gases confined thereby and mixing said other stream with said exhaust gases completely across said duct structure.

3. An apparatus as set forth in claim 2 in which said duct structure comprises at least one pair of opposed walls each having an undulating configuration.

4. An apparatus as set forth in claim 3 in which said duct structure further comprises another pair of opposed walls operatively connected between said one pair of opposed walls and wherein each of said walls of said other pair has a roughly planar configuration.

5. An apparatus as set forth in claim 4 in which said one and other pair of opposed walls define said entire duct structure, said duct structure having a cross-sectional area which increases as the distance rearwardly from said engine increases.

6. An apparatus for suppressing infrared radiation emitted from hot metal parts at the aft end of a gas turbine engine and from the exhaust gas plume thereof during engine operation comprising a dual purpose ejector vane assembly operatively attached to said engine for introducing cooling ambient air into the hot engine exhaust gases and hiding said hot metal parts and means attaching said vane assembly to said engine, said vane assembly comprising, a tubular duct structure for receiving and confining said engine exhaust gases, and ejector means providing a plurality of streams of cooling ambient air completely across said duct structure to break the exhaust gases confined by said duct structure during engine operation into a plurality of separate exhaust gas streams and provide optimum mixing of said streams of cooling ambient air with said exhaust gases completely across said duct structure.

7. An apparatus as set forth in claim 6 in which said duct structure is defined by two pairs of opposed walls wherein one of said pairs of opposed walls has an undulating configuration, and said ejector means comprises a plurality of elongated slot means in each wall of said one pair of walls.

8. An apparatus as set forth in claim 7 in which said ejector means further comprises at least one tubular vane disposed in said duct structure between and supported by said other pair of walls, said tubular vane having opposite open end portions extending through said other pair of walls to provide open ends exposed to ambient air and having integral slot means, said tubular vane serving to introduce additional cooling ambient air through its open ends and substantially perpendicular to said other pair of walls, said additional cooling ambient air being turned by said tubular vane and provided through said slot means into said exhaust gases at locations between said one pair of walls and in a plurality of roughly parallel streams.

9. An apparatus as set forth in claim 8 in which said tubular vane is a hollow airfoil-shaped vane.

10. An apparatus as set forth in claim 9 in which said airfoil-shaped vane has opposed cooperating walls and said slot means in said airfoil-shaped vane comprises a plurality of elongated slot means in each of said cooperating walls.

11. An apparatus as set forth in claim 7 in which said ejector means further comprises a plurality of hollow airfoil-shaped vanes disposed in said duct structure between and supported by said other pair of walls, said vanes dividing the volume between said one pair of walls into a plurality of chambers of substantially equal volume, each of said vanes having opposite open end portions extending through said other pair of walls to provide open ends exposed to ambient air and having integral slot means, each vane serving to introduce additional cooling ambient air through its open ends and substantially perpendicular to said other pair of walls, said additional cooling ambient air being turned by said vanes and provided through said slot means in each vane into said exhaust gases at locations between said one pair of walls and in a plurality of roughly parallel streams.

12. An apparatus as set forth in claim 11 in which each of said airfoil-shaped vanes has opposed cooperating walls and said slot means in each vane comprises a plurality of elongated slot means in each of the cooperating walls of a vane.

13. An apparatus as set forth in claim 12 in which each wall of said one pair of walls of said duct structure and each wall of said cooperating walls of each of said vanes is comprised of a plurality of heat transfer panel assemblies defined as an integral part of its wall, said heat transfer panel assemblies having said slot means defined therein as a part thereof.

14. An apparatus as set forth in claim 13 in which each of said heat transfer panel assemblies comprises a pair of wall portions having an undulating strip fixed therebetween in sandwiched relation and the space between said wall portions defined by said undulating strip defines a slot means in an associated panel assembly.

15. An apparatus for suppressing infrared radiation emitted from hot metal parts at the aft end of a gas turbine engine and from the exhaust gas plume thereof during engine operation comprises a dual purpose ejector vane assembly operatively attached to said engine for introducing cooling ambient air into the hot engine exhaust gases and hiding said hot metal parts and means attaching said vane assembly to said engine, said vane assembly comprising, a tubular duct structure for receiving and confining said engine exhaust gases, and ejector means providing a plurality of streams of cooling ambient air completely across said duct structure to break the exhaust gases confined by the duct structure during engine operation into a plurality of separate exhaust gas streams and provide optimum mixing of said streams of cooling ambient air with said exhaust gases completely across said duct structure, said duct structure being defined by two pairs of opposed walls wherein one of said pair of opposed walls has an undulating configuration, said ejector means comprising a plurality of elongated slot means in each wall of said one pair of walls, said ejector means further comprising a plurality of hollow airfoil-shaped vanes disposed in said duct structure between and supported by said other pair of walls, said vanes dividing the volume between said one pair of walls into a plurality of chambers of substantially equal volume, each of said vanes having opposite open end portions extending through said other pair of walls to provide open ends exposed to ambient air and having integral slot means, each vane serving to introduce additional cooling ambient air through its open ends and substantially perpendicular to said other pair of walls, said additional cooling ambient air being turned by said vanes and provided through said slot means in each vane into said exhaust gases at locations between said one pair of walls and in a plurality of roughly parallel streams, each of said airfoil-shaped vanes having opposed cooperating walls and said slot means in each vane comprising a plurality of elongated slot means in each of the cooperating walls of a vane, each wall of said one pair of walls of said duct structure and each wall of said cooperating walls of each of said vanes being comprised of a plurality of heat transfer panel assemblies defined as an integral part of its wall, said heat transfer panel assemblies having said slot means defined therein as a part thereof, each of said heat transfer panel assemblies comprising a pair of wall portions having an undulating strip fixed therebetween in sandwiched relation and the space between said wall portions defined by said undulating strip defining a slot means in an associated panel assembly, said undulating strip having a substantially rectangular wave form when viewed from an end thereof and having openings therein which serve as turbulators aiding in the cooling of their associated panel by the cooling ambient air flowing therethrough.

16. An apparatus as set forth in claim 11 in which said two pairs of opposed walls of said duct structure define a substantially rectangular peripheral outline at each cross section therealong which is perpendicular to a longitudinal axis through said duct structure.

17. An apparatus for suppressing infrared radiation emitted from hot metal parts at the aft end of a gas turbine engine and from the exhaust gas plume thereof during engine operation comprising a dual purpose ejector vane assembly operatively attached to said engine for introducing cooling ambient air into the hot engine exhaust gases and hiding said hot metal parts and means attaching said vane assembly to said engine, said vane assembly comprising, a tubular duct structure for receiving and confining said engine exhaust gases, and ejector means providing a plurality of streams of cooling ambient air completely across said duct structure to break the exhaust gases confined by said duct structure during engine operation into a plurality of separate exhaust gas streams and provide optimum mixing of said streams of cooling ambient air with said exhaust gases completely across said duct structure, said duct structure being defined by two pairs of opposed walls wherein one of said pairs of opposed walls has an undulating configuration, said ejector means comprising a plurality of elongated slot means in each wall of said one pair of walls, said ejector means further comprising a plurality of hollow airfoil-shaped vanes disposed in said duct structure between said supported by said other pair of walls, said vanes dividing the volume between said one pair of walls into a plurality of chambers of substantially equal volume, each of said vanes having opposite open end portions extending through said other pair of walls to provide open ends exposed to ambient air and having integral slot means, each vane serving to introduce additional cooling ambient air through its open ends and substantially perpendicular to said other pair of walls, said additional cooling ambient air being turned by said vanes and provided through said slot means in said vane into said exhaust gases at locations between said one pair of walls and in a plurality of roughly parallel streams, each of said vanes having means for changing the area of its opposite open end portions to thereby control the amount of additional cooling ambient air introduced through said open ends.

18. An apparatus as set forth in claim 17 in which one of the walls of said one pair of walls also has means for introducing more cooling ambient air into said duct structure.

19. An apparatus as set forth in claim 18 in which said means for changing the area of the opposite end portions of each vane and said means in said one wall of said one pair of walls for introducing more cooling ambient air into said duct structure comprising a V-shaped wall portion in each end of each vane and a V-shaped wall portion in each end of said one wall of said one pair of walls, each V-shaped wall portion having a movable leg which is movable to increase or decrease the area bounded thereby to change the amount of cooling ambient air which may be introduced therein.

20. An apparatus as set forth in claim 19 and further comprising actuating means for actuating each of said movable legs.

21. A method of suppressing infrared radiation emitted from hot metal parts at the aft end of a gas turbine engine and from the exhaust gas plume thereof during engine operation comprising the steps of, attaching a dual purpose ejector vane assembly to the aft end of said engine to receive hot engine exhaust gases therethrough and hide said hot metal parts, said vane assembly comprising a fluid confining duct structure, and introducing at least one stream of cooling ambient air completely across said duct structure to break the exhaust gases confined by the duct structure during engine operation into a plurality of exhaust gas streams and provide optimum mixing of said one stream with said exhaust gases completely across said duct structure.

22. A method as set forth in claim 21 and comprising the further step of introducing at least another stream of cooling ambient air completely across said duct structure and the exhaust gases confined thereby and mixing said other stream with said exhaust gases completely across said duct structure. said one stream and said other stream comprising streams of a plurality of streams of cooling ambient air introduced into said duct structure to break the exhaust gases confined by the duct structure into said plurality of exhaust gas streams.

23. A method as set forth in claim 22 in which said attaching step comprises attaching said dual purpose vane assembly comprised of a fluid confining duct structure defined by opposed pairs of walls.

24. A method as set forth in claim 22 in which said steps of introducing streams of cooling ambient air comprises introducing said cooling ambient air by ejector action.

25. A method as set forth in claim 24 and comprising the further step of controlling the volume of each stream introduced by ejector action.

* * * * *

UNITED STATES PATENT OFFICE
CERTIFICATE OF CORRECTION

PATENT NO. : 4,007,587
DATED : February 15, 1977
INVENTOR(S) : Clifford R. Banthin et al It is certified that error appears in the above-identified patent and that said Letters Patent are hereby corrected as shown below:

Col. 2, line 34, after "FIG.5 is" insert -- a -- .

Col. 4, line 29, "open ends 52" should read

-- open ends 53 -- .

Col. 5, line 53, "ambinet" should read -- ambient -- .

Col. 11, line 13, "comprises" should read -- comprising -- .

Col. 12, line 26, "between said supported" should read

-- between and supported -- .

Col. 12, line 37, "in said vane" should read

-- in each vane -- .

Col. 12, line 52, "comprising" should read -- comprises -- .

Col. 13, line 15, "." should read -- , --.

Signed and Sealed this

Third Day of May 1977

[SEAL]

Attest:

RUTH C. MASON
Attesting Officer

C. MARSHALL DANN
Commissioner of Patents and Trademarks